US011785885B2

(12) United States Patent
Meemken et al.

(10) Patent No.: US 11,785,885 B2
(45) Date of Patent: Oct. 17, 2023

(54) MOWER WITH GANGED REEL CUTTING UNITS HAVING AUTOMATIC CLIP CONTROL IN BOTH STRAIGHT AHEAD MOTION AND IN TURNS

(71) Applicant: The Toro Company, Bloomington, MN (US)

(72) Inventors: Kelly S. Meemken, Savage, MN (US); Benjamin A. Bricko, Faribault, MN (US)

(73) Assignee: The Toro Company, Bloomington, MN (US)

( * ) Notice: Subject to any disclaimer, the term of this patent is extended or adjusted under 35 U.S.C. 154(b) by 907 days.

(21) Appl. No.: 16/263,808

(22) Filed: Jan. 31, 2019

(65) Prior Publication Data

US 2020/0245560 A1   Aug. 6, 2020

(51) Int. Cl.
*A01D 34/00* (2006.01)
*A01D 34/44* (2006.01)
(Continued)

(52) U.S. Cl.
CPC ........... *A01D 34/44* (2013.01); *A01D 34/006* (2013.01); *A01D 34/58* (2013.01); *A01D 69/025* (2013.01);
(Continued)

(58) Field of Classification Search
CPC .... A01D 69/025; A01D 34/58; A01D 34/006; A01D 34/42; A01D 34/43; A01D 34/44;
(Continued)

(56) References Cited

U.S. PATENT DOCUMENTS 4,395,865 A    8/1983  Davis, Jr. et al.
5,794,422 A    8/1998  Reimers et al.
(Continued)

FOREIGN PATENT DOCUMENTS

EP        2253197 A1     11/2010
GB        1093251        11/1967
WO     2017/066396 A1    4/2017

OTHER PUBLICATIONS

International Preliminary Report on Patentability for PCT/US2020/015642 dated Jul. 27, 2021.
(Continued)

*Primary Examiner* — Alicia Torres
(74) *Attorney, Agent, or Firm* — Merchant & Gould P.C.

(57) ABSTRACT

A gang reel mower has a hybrid engine, generator and battery pack electric power system driving a pair of electric wheel motors for propelling the mower and for driving individual reel motors for powering a plurality of reel cutting units. A master controller is programmable with a selected clip and maintains the selected clip whether the mower travels straight ahead or is turning. The output power of the generator is damped and is gradually increased during high electrical loads to prevent step responses in the engine and thereby limit engine droop. During regenerative braking of the mower, the generator can be driven as a motor to use the engine as a load. This limits the voltage produced by the traction motors during regenerative braking from damaging the electrical system or overcharging the battery pack. Moreover, maximum transport and mowing ground speeds are automatically reduced during some turns of the mower.

9 Claims, 10 Drawing Sheets

(51) Int. Cl.
*A01D 34/58* (2006.01)
*A01D 69/02* (2006.01)
*B60W 30/18* (2012.01)
*B60W 30/184* (2012.01)
*B62D 11/00* (2006.01)

(52) U.S. Cl.
CPC .... *B60W 30/184* (2013.01); *B60W 30/18127* (2013.01); *B62D 11/006* (2013.01)

(58) Field of Classification Search
CPC . A01D 34/56; A01D 34/62; B60W 2300/156; B62D 11/006
See application file for complete search history.

(56) References Cited

U.S. PATENT DOCUMENTS

| | | | | |
|---|---|---|---|---|
| 6,109,009 | A * | 8/2000 | Benson | A01D 69/02 |
| | | | | 56/10.2 G |
| 7,111,443 | B2 * | 9/2006 | Anderson | A01D 34/47 |
| | | | | 56/10.8 |
| 7,610,975 | B1 | 11/2009 | Gust et al. | |
| 8,621,833 | B2 * | 1/2014 | Shida | A01D 34/006 |
| | | | | 56/10.2 H |
| 9,439,349 | B2 * | 9/2016 | Drake | A01D 34/58 |
| 9,635,809 | B2 * | 5/2017 | Iyasere | A01D 34/006 |
| 10,264,726 | B2 * | 4/2019 | Henson | A01D 34/44 |
| 10,687,464 | B2 * | 6/2020 | Zeiler | A01D 34/66 |
| 2004/0055266 | A1 | 3/2004 | Reimers et al. | |
| 2012/0136539 | A1 * | 5/2012 | Bryant | A01D 34/006 |
| | | | | 701/42 |
| 2014/0283492 | A1 | 9/2014 | Bricko et al. | |
| 2016/0106031 | A1 | 4/2016 | Bejcek | |
| 2017/0042084 | A1 * | 2/2017 | Waitt | A01D 34/80 |
| 2018/0279548 | A1 * | 10/2018 | Goman | A01D 34/475 |

OTHER PUBLICATIONS

Great Britain Combined Search and Examination Report for Application No. GB2300511.9 dated Feb. 9, 2023.

\* cited by examiner

MOWER WITH GANGED REEL CUTTING UNITS HAVING AUTOMATIC CLIP CONTROL IN BOTH STRAIGHT AHEAD MOTION AND IN TURNS

TECHNICAL FIELD

This invention relates to reel mowers carrying a plurality of reel cutting units in a gang configuration and in some embodiments a hybrid electric power system.

BACKGROUND OF THE INVENTION

Reel mowers are known for mowing grass on large turf surfaces to provide a high quality of cut at very low heights of cut. Such turf surfaces include the fairways and greens of golf courses, sport fields, and the like. Traditionally, many reel mowers used for this purpose carry a plurality of reel cutting units arranged in a gang configuration on the frame of the mower. This permits the mower to cut a wide swath of grass during each pass of the mower over the turf surface. An operator is usually carried in a seated position on the frame of the mower to drive and guide the mower over the turf surface and to control the operation of the cutting units during a grass mowing operation.

The power systems used to propel the mower and to drive the cutting reels of the cutting units have evolved over time from wholly mechanical systems, to mixed mechanical and hydraulic systems, and more recently to electrical systems, either a hybrid system having an engine, generator and battery pack or an all battery system. This evolution presents some problems not present in mechanical or hydraulic systems. Some of these problems comprise the need to properly charge the battery packs of electrical systems without damaging the battery packs and the need to control the generator from imposing sudden, large loads on any engine that might be present in a hybrid power system. However, electrical systems also present opportunities to improve the performance of the reel cutting units. This invention is directed to solving various problems which the Applicants have identified with use of the newer electrical power systems while using the capabilities of such power systems to improve the quality of cut provided by the reel cutting units powered by such systems.

SUMMARY OF THE INVENTION

One aspect of this invention relates to a method of providing and operating a reel mower. The method comprises providing a plurality of reel cutting units, each reel cutting unit comprising a cutting reel rotatable about a substantially horizontal axis of rotation and a bedknife cooperable with the cutting reel for cutting grass. The method also comprises arranging the cutting units in a gang configuration on a frame of the mower and powering the cutting reels using power produced by a power system carried on the frame of the mower. In addition, the method further comprises rotating the cutting reels at a substantially common rotational speed during straight ahead motion of the frame of the mower while conducting a grass cutting operation, and further rotating at least two of the cutting reels at different rotational speeds relative to each other during turns of the frame of the mower while conducting the grass cutting operation. In addition to the method described above, this aspect of the invention also includes a reel mower embodying this method.

Another aspect of this invention relates to a second method of providing and operating a mower. The second method comprises providing at least one grass cutting unit and arranging the at least one grass cutting unit on a frame of the mower. In addition, the second method further comprises self-propelling the frame of the mower using at least one electric traction motor and/or powering the at least one grass cutting unit using an electric cutting unit motor, wherein the traction and/or cutting unit motors are powered by electrical power produced by a hybrid electrical power system carried on the frame of the mower. The hybrid electrical power system includes an engine, a generator mechanically driven by the engine for generating electrical output power, and a battery pack for storing electrical power. The second method finally comprises limiting the generator output power during temporary spikes in electrical load demand on the hybrid electric power system to thereby dampen load on the engine from the generator so as to minimize engine droop during the temporary spikes in electrical load demand. In addition to the method described above, this aspect of the invention also includes a mower embodying this method.

A further aspect of this invention relates to a third method of providing and operating a mower. The third method comprises providing at least one grass cutting unit and arranging the grass cutting unit on a frame of the mower. In addition, the third method further comprises self-propelling the frame of the mower using at least one electric traction motor that is powered by electrical power produced by a hybrid electrical power system carried on the frame of the mower. The hybrid electrical power system includes an engine, a generator mechanically driven by the engine for generating electrical output power, and a battery pack for storing electrical power. The third method finally comprises comparing a voltage of the battery pack to a nominal target voltage produced by the generator when the generator is being driven by the engine, and operating the generator as a motor to overdrive the engine during regenerative braking of the at least one traction motor when the voltage of the battery pack exceeds the nominal target voltage of the generator. In addition to the method described above, this aspect of the invention also includes a mower embodying this method.

Yet another aspect of this invention relates to a fourth method of providing and operating a mower. The fourth method comprises providing at least one grass cutting unit and arranging the at least one grass cutting unit on a self-propelled frame of the mower. In addition, the fourth method further comprises setting a maximum ground speed that the self-propelled frame may be driven at in at least one operational mode of the mower. Finally, the further method comprises automatically lowering the maximum ground speed setting during at least some turns of the mower when the mower is operating in the at least one operational mode. In addition to the method described above, this aspect of the invention also includes a mower embodying this method.

BRIEF DESCRIPTION OF THE DRAWINGS

This invention will be described more fully in the following Detailed Description, when taken in conjunction with the following drawings, in which like reference numerals refer to like elements throughout.

DETAILED DESCRIPTION

Overview

Figure 1:
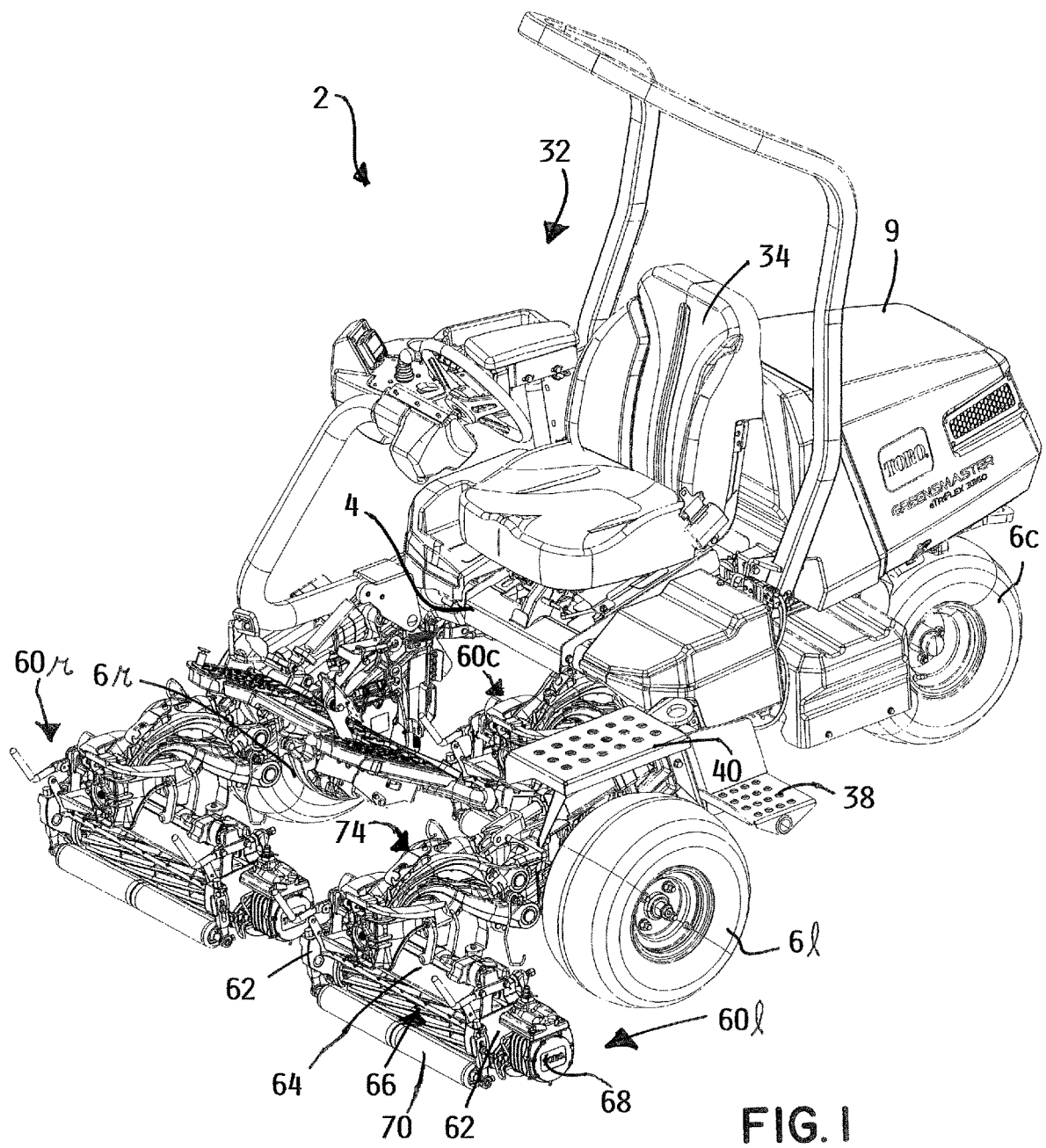
FIG. 1 is a front left perspective view of one embodiment of a reel mower according to this invention.

A reel mower 2 according to one embodiment of this invention is illustrated generally in FIGS. 1-5. Mower 2 has a frame 4 supported by a plurality of rotatable ground engaging wheels 6 for rolling over a ground or turf surface. Wheels 6 include a pair of left and right front drive wheels 6l, 6r which are laterally offset to either side of a longitudinal centerline cl of mower 2 and a single steerable, undriven, center rear wheel 6c located substantially on mower centerline cl. Alternatively, a pair of steerable rear wheels 6c which are also laterally offset to either side of mower centerline cl could be used. The rear wheel(s) 6c could also be driven in an alternative all-wheel drive embodiment of mower 2.

Frame 4 carries a power system that may take different forms. In one embodiment of this invention, the power system is a hybrid system that combines a gasoline or diesel internal combustion engine 8, an electric power generator 10 that is mechanically driven by engine 8, and a 48V battery pack 12 that is electrically connected to generator 10. Such a hybrid power system for use in a mower is disclosed in U.S. Pat. No. 7,610,975, which is assigned to The Toro Company, the assignee of this invention. The '975 patent is incorporated by reference herein with respect to the general operation of the hybrid power system used herein.

Figure 2:
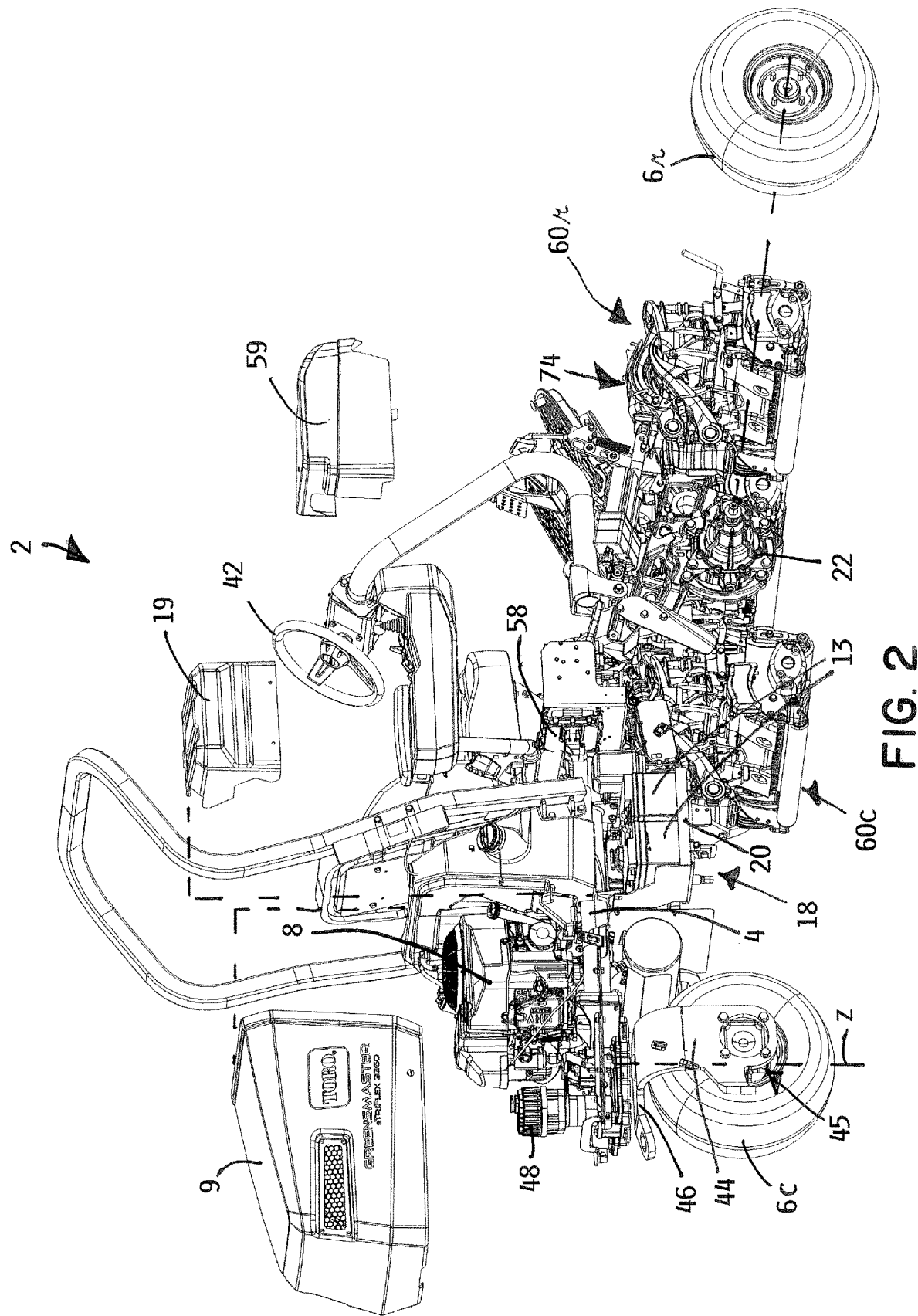
FIG. 2 is a rear right perspective view of the reel mower of FIG. 1, particularly illustrating the right front drive wheel, the engine hood, a cover of a battery storage pod, and a cover of an electronics enclosure in exploded form.
Figure 4:
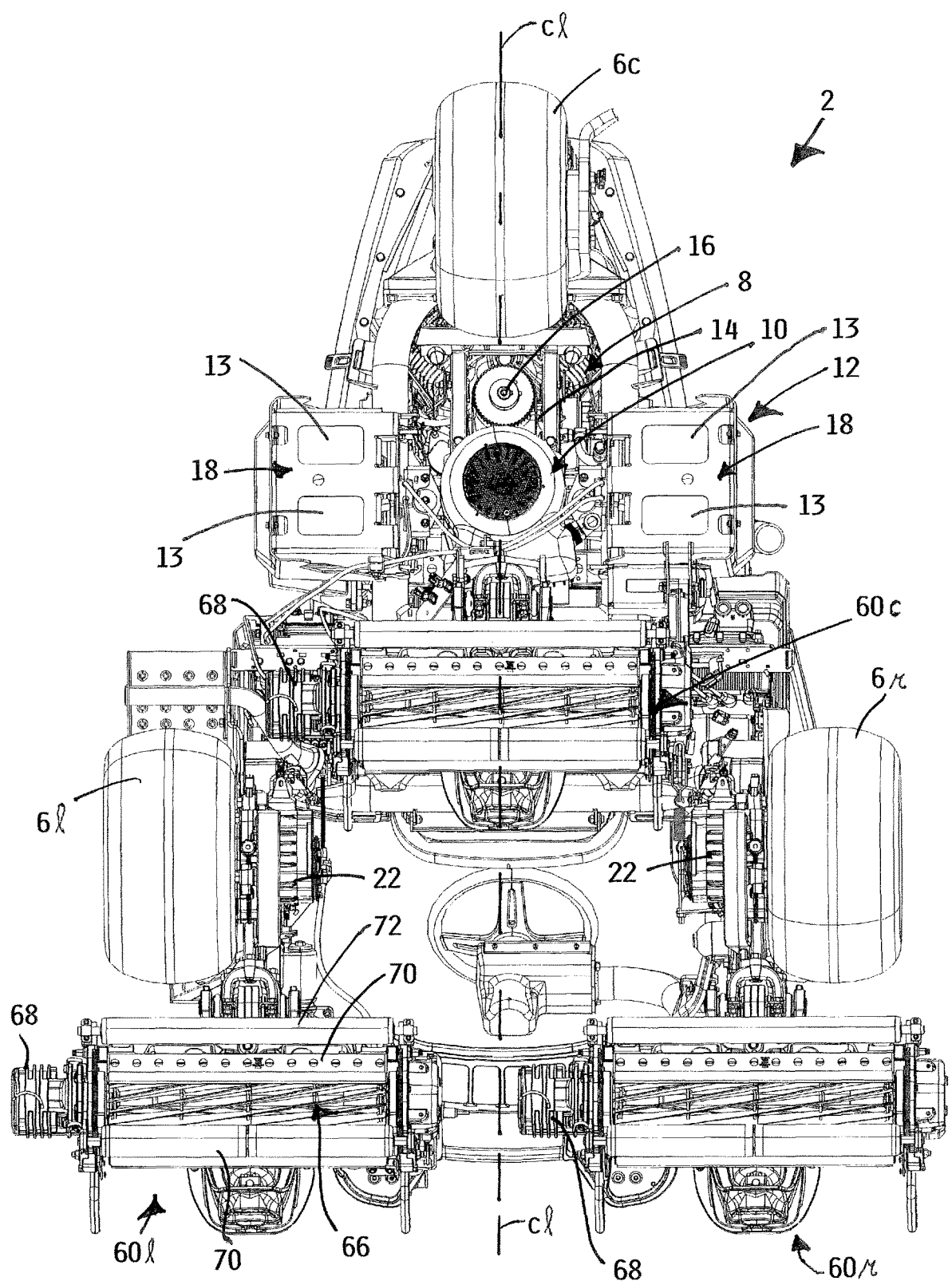
FIG. 4 is a bottom plan view of the reel mower of FIG. 1.
Figure 5:
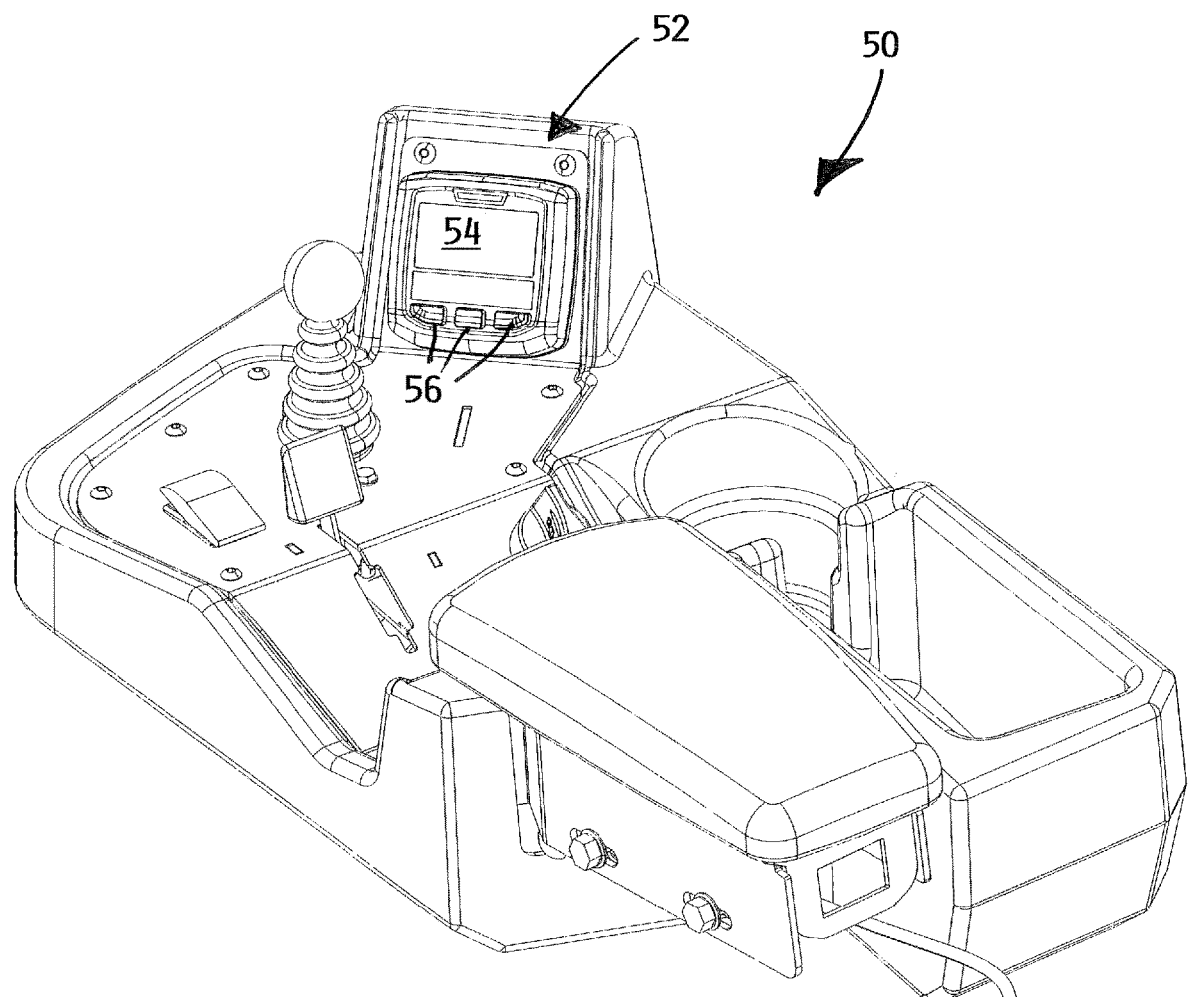
FIG. 5 is a perspective view of the control console that is part of the operator station of the reel mower of FIG. 1.

As best shown in FIGS. 2 and 4, engine 8 is mounted on a rear end of frame 4 and is normally covered by an engine hood 9, shown in exploded form in FIG. 2 so that engine 8 can be seen. Generator 10 is located beneath and slightly forward of engine 8. See FIG. 4. Any suitable drive, such as a cogged belt drive 14, can be used to transmit power from a drive shaft 16 of engine 8 to generator 10 to spin generator 10 in a direction in which generator 10 produces electrical energy. This electrical energy is stored in battery pack 12 or is used directly by the electrically driven components of mower 2 in a manner typical of a hybrid power system.

For ease of access, the four 12V batteries 13 that make up battery pack 12 are carried in groups of two in a pair of external storage pods 18. Pods 18 are externally mounted to opposite sides of frame 4 to be located generally on opposite sides of engine 8 and generator 10 as best shown in FIG. 4. FIG. 2 depicts pod 18 on the right side of frame 4 with the cover 19 of pod 18 being shown in exploded form to illustrate the two batteries 13 carried in the tray shaped bottom 20 of pod 18.

The symmetrical placement of pods 18 relative to mower centerline cl help balance the weight of battery pack 12 on opposite sides of frame 4 in a location that is also approximately midway between front wheels 6l, 6r and rear wheel 6c. This improves the overall fore and aft and side to side balance of mower 2 while providing easy access to batteries 13 for service or replacement. In addition to the four batteries 13 that make up the 48V battery pack 12, mower 2 includes an additional 12V battery (not shown) for powering electrical systems on mower 2 that utilize lower voltage, such as control systems, lights, etc.

Frame 4 further carries a traction drive system that rotates drive wheels 6 to self-propel frame 4 in forward and reverse over the ground or turf surface. One embodiment of the traction drive system comprises a separate electric traction or wheel motor 22 operatively coupled to each drive wheel 6. Wheel motors 22 are powered in a known manner by the electric power provided by generator 10 and/or by battery pack 12. Alternatively, the separate wheel motors 22 that power drive wheels 6 could be replaced with a single electric motor that powers drive wheels 6 through a mechanical differential. In some embodiments of this invention, electric wheel motor(s) 22 could also be hydraulic motor(s) which are powered by a hydraulic fluid supply system that is powered by engine 8 or some other prime mover.

Figure 3:
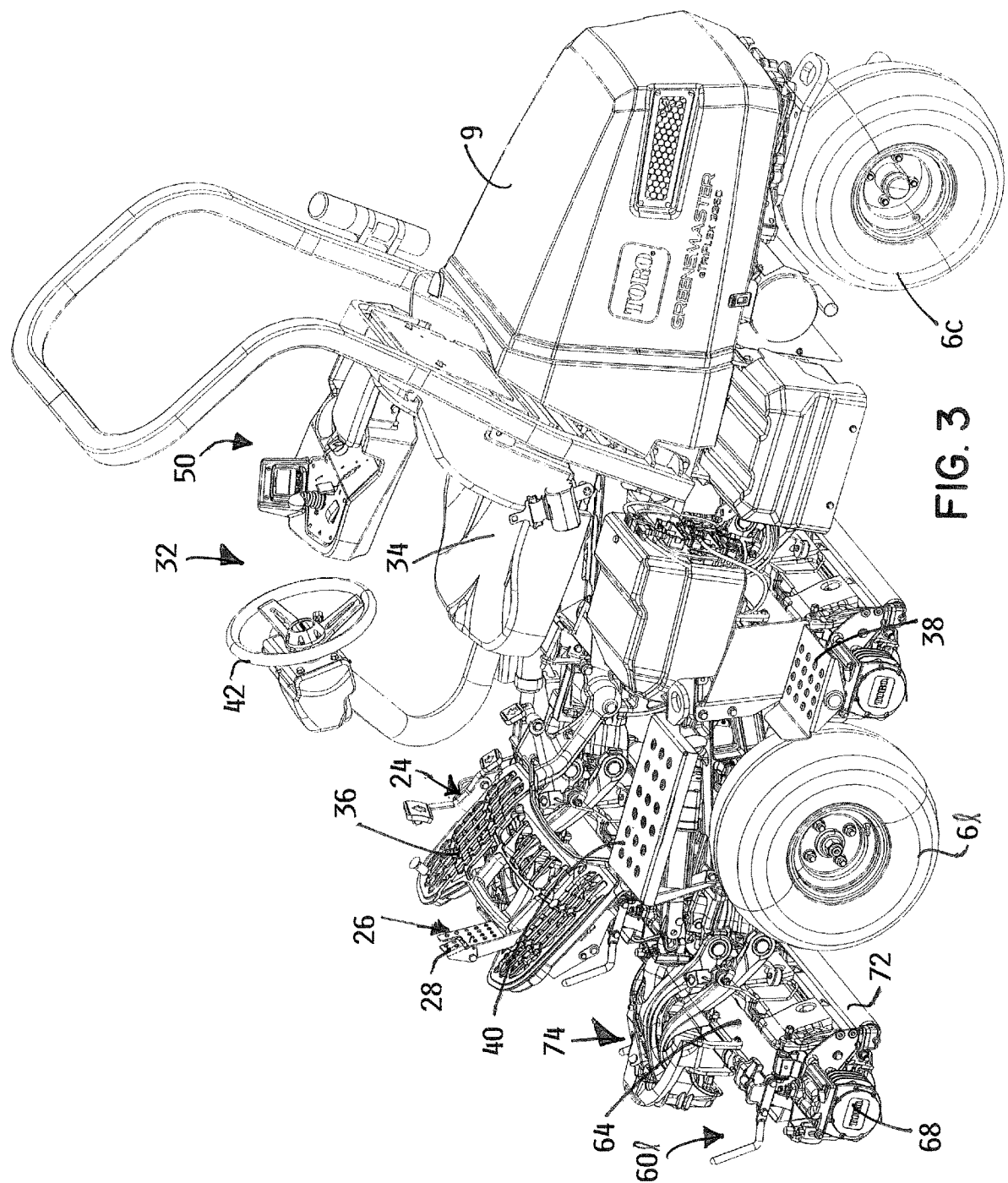
FIG. 3 is a rear left perspective view of the reel mower of FIG. 1.

Referring now to FIG. 3, a traction control, such as but not limited to a pivotal foot operated traction pedal 24, may be rocked by the operator forwardly out of a neutral position to cause wheel motors 22 to be driven forwardly to self-propel frame 4 forwardly. Similarly, traction pedal 24 may be rocked by the operator rearwardly out of the neutral position to cause wheel motors 22 to be driven rearwardly to self-propel frame 4 rearwardly. In a typical mode of operation of mower 2, the ground speed in forward or reverse is variable between zero and a maximum forward speed or a maximum reverse speed depending upon the amount of the forward or reverse travel of traction pedal 24 out of the neutral position thereof. Thus, the operator can selectively and continuously vary the forward and reverse speeds of mower 2 during a grass cutting operation of mower 2, or during transport of mower 2 from place to place, according to how far traction pedal 24 is rocked forwardly or rearwardly relative to neutral by the operator's foot.

A brake control, such as but not limited to a pivotal foot operated brake pedal 26, may be depressed to activate a brake system to slow the ground speed of frame 4 or to bring frame 4 to a complete stop. Preferably, the brake system comprises regenerative braking in which wheel motors 22 are driven in reverse. In addition, the brake system additionally includes mechanical service brakes, such as but not limited to disc brakes (not shown), for each drive wheel 6. Wheel motors 22 when slowing during regenerative braking act as generators with the electric power being created therein being fed back to battery pack 12 to charge the batteries 13 in battery pack 12 during braking of mower 2.

The brake system of mower 2 may in other embodiments of the invention comprise regenerative braking alone or mechanical braking alone. However, when the two forms of braking are combined, mower 2 may more easily and cost effectively comply with various applicable standards that require mower 2 to come to a complete stop at certain speeds within a mandated distance while retaining the battery pack charging advantages of regenerative braking. In addition, brake pedal 26 carries a pivotal locking tab 28, best shown in FIG. 3, that can be selectively used by the operator to engage a pawl and ratchet detent (not shown) that holds brake pedal 26 in a depressed condition even if the operator thereafter removes his or her foot from brake pedal 26. This will keep the mechanical service brakes applied to act as parking brakes to thereby hold mower 2 stationary when it is parked.

An operator station 32 is provided on frame 4 for supporting an operator who is carried on frame 4 when operating mower 2. Operator station 32 includes a seat 34 on which the operator sits when operating mower 2 with the operator's feet resting against a foot platform 36. A lower step 38 and an upper step 39 are provided on the left side of frame 4 to allow the operator to step up onto frame 4 to reach seat 34. The right side of foot platform 36 carries traction pedal 24 while the left side of foot platform 36 carries brake pedal 26.

A steering wheel 42 is positioned in operator station 32 ahead of seat 34 to allow the seated operator to steer mower 2 during operation thereof. As shown in FIG. 2, steerable rear wheel 6c is rotatably journaled on a vertical side plate 44 of an L-shaped wheel support 45. Wheel support 45 has a horizontal top plate 46 which is pivotally mounted to frame 4 by a vertical pivot. This allows wheel support 45 and rear wheel 6c carried thereon to swing from side to side about a vertical steering axis z to steer mower 2 from side to side.

An electric steering motor 48 is carried on the rear end of frame 4 above wheel support 45. Motor 48 is operatively connected to wheel support 45 to pivot wheel support 45 about steering axis z. When the operator turns steering wheel 42 to the right or to the left from a centered position thereof, a control system responsive to such movement activates steering motor 48 to swing wheel support 45 in the direction required to turn mower 2 to the right or to the left. This will result in a turn in the selected direction whose sharpness corresponds to the degree the operator has turned steering wheel 42 out of its centered position.

A control console 50 is provided on the right side of operator station 32. Control console 50 includes a user interface 52 that has at least one LCD or similar visual display 54 and a plurality of navigation/data entry buttons 56. In an alternative embodiment, user interface 52 may be a touch screen device that displays virtual rather than physical navigation/data entry buttons 56. Among other things, display 54 of user interface 52 visually provides to the operator various operational information relating to mower 2 and/or various fault conditions or warnings concerning mower 2.

User interface 52 is connected through a CAN bus to a master controller 58 carried on frame 4 with other subcontrollers for various electrical components carried on frame 4, such as generator 10, wheel motors 22, steering motor 48, reel motors 68, and the like, also being on the CAN bus. See FIG. 2 where a cover 59 normally enclosing master controller 58 is shown in exploded form for the sake of illustrating master controller. Preferably, master controller 58 is a microcomputer that stores and executes software programming for controlling various aspects of the operation of mower 2. Such programming allows master controller 58 to provide various menus on display 54 of user interface 52 to permit the operator to initially set or reset various parameters of the operation of mower 2 that may have different values according to the operator's preferences or the conditions faced by mower 2 at a particular time. The operator can then use the navigation/data entry buttons 56 on user interface 52 to scroll through the screens of a particular menu to select or input a desired value for the parameter to which that menu is directed. Some of the parameters which can be set or reset include a maximum ground speed in a mowing mode, a maximum ground speed in a transport mode, a maximum reverse ground speed, and a desired clip.

Plural reel cutting units 60 are carried on frame 4 in a gang configuration. In one embodiment of this invention as shown in the drawings hereof, three reel cutting units 60 are arranged on frame 4 in a 2-1 configuration. This configuration comprises a left front cutting unit 60l arranged ahead of left front wheel 6l, a right front cutting unit 60r arranged ahead of the opposite right front wheel 6r, and a center rear cutting unit 60c arranged between front wheels 6l, 6r and center rear wheel 6c. Rear cutting unit 60c covers the gap between the two front cutting units 60l, 60r such that all three cutting units 60 collectively cut a single unbroken swath of grass during each pass of mower 2 over a turf surface. This 2-1 configuration is so well known in the art that a mower using it is often referred to as a "triplex" mower.

Other gang configurations employing three reel cutting units 60 in a different configuration, e.g. a 1-2 configuration, or more than three cutting units 60 in various configurations, e.g. a 3-2 or 2-3 configuration and a 4-3 or 3-4 configuration, could also be used. Moreover, a 1-1 gang configuration could also be used comprising a single forward reel cutting unit 60 arranged ahead of a single rearward reel cutting unit 60. In such a 1-1 gang configuration, the two cutting units are substantially but not entirely laterally staggered relative to each other such that adjacent ends of cutting units 60 overlap with one another, e.g. a two inch overlap on two cutting units each having a 21" width. This allows the cutting units to cut a single unbroken swath of grass which is substantially wider than the cutting width of either cutting unit 60 alone without leaving a strip of uncut grass between them. The term gang configuration as used herein is intended to cover all of the above noted gang configurations and any other configuration that utilizes two or more reel cutting units that are arranged relative to each other to cut a single unbroken swath of grass which is wider than the cutting widths of the reel cutting units that are so arranged.

Each cutting unit 60 includes a cutting unit frame having a pair of spaced side plates 62 connected together by a top wall 64 and an arcuate rear shield (not shown). A cutting reel 66 is positioned beneath top wall 64 and ahead of the arcuate rear shield of the cutting unit frame. Cutting reel 66 is rotatably journalled between side plates 62 of the cutting unit frame for rotation about a substantially horizontal axis. A separate electric motor 68 is mounted to one side plate 62 of any given cutting unit frame for individually driving cutting reel 66 carried on the given cutting unit frame. In some embodiments of this invention, electric reel motors 68 could be hydraulic motors which are powered by a hydraulic fluid supply system that is powered by engine 8 or some other prime mover.

Cutting reel 66 includes a plurality of circumferentially spaced, helical blades carried around the periphery thereof which sweep blades of uncut grass against a sharpened front cutting edge of a cooperating laterally extending bedknife 70 such that the grass is cut against the bedknife in a shearing action. After the grass is cut in this manner, the grass clippings are directed up and around the upper rear quadrant of cutting reel 66 by the rear shield to be discharged forwardly beneath top wall 64 of the cutting unit frame. A grass collector (not shown) may be attached to the front of the cutting unit frame for collecting such grass clippings. One or more rollers, e.g. both a front roller 70 and a rear roller 72 in the case of the cutting units disclosed herein, are rotatably journalled on side plates 62 of the cutting unit frame to help support the cutting unit for rolling on the turf surface when cutting grass.

A substantially identical suspension system 74 is used to individually mount each reel cutting unit 60 to frame 4 of mower 2. Each suspension system 74 lifts and lowers reel cutting unit 60 to which it is attached between a raised transport position and a lowered grass cutting position. In addition, each suspension system permits reel cutting unit 60 to which it is attached to move independently relative to frame 4 of mower 2 about one or more axes of motion. In one embodiment, each suspension system 74 allows reel cutting unit 60 to which it is attached to pitch, roll and yaw relative to frame 4 of mower 2 about x, y and z axes of motion. This permits cutting units 60 to follow ground contours independently of frame 4 of mower 2 to provide a better quality of cut.

The suspension system 74 preferably used for each reel cutting unit 60 is disclosed in U.S. Pat. No. 8,544,251, which is assigned to The Toro Company, the assignee of this invention. The '251 patent is incorporated by reference herein with respect to the general structure and operation of suspension system 74 of each reel cutting unit.

Automatic Clip Control

The term "clip" in the reel mowing art refers to a characteristic of the operation of reel cutting units 60 carried on frame 4 of mower 2, namely the amount of forward travel of each cutting unit in the time interval that it takes for successive blades on cutting reel 66 to contact a predetermined reference spot on the bedknife. When one thinks of clip in this manner, clip is expressed as a length, most often as a fraction of an inch (e.g. 0.25 inches), that is the amount of forward travel between successive cuts. Thus, the shorter the clip (e.g. 0.125 inches), the shorter the distance between successive cuts. Conversely, the longer the clip (e.g. 0.50 inches), the longer the distance between successive cuts, everything else being equal. Longer clips are generally used for higher heights of cut while smaller clips are generally used for shorter heights of cut. The terms "frequency of cut" or "frequency of clip" are sometimes used in the art as synonyms for the term "clip".

Clip is dependent on a number of factors: 1) the number of blades on cutting reel 66, 2.) the ground speed of frame 4 of mower 2, and 3) the speed of rotation of cutting reel 66. One aspect of this invention is an improved method and apparatus for automatically maintaining a predetermined clip that is to be used in a particular grass cutting operation of mower 2.

Figure 6:
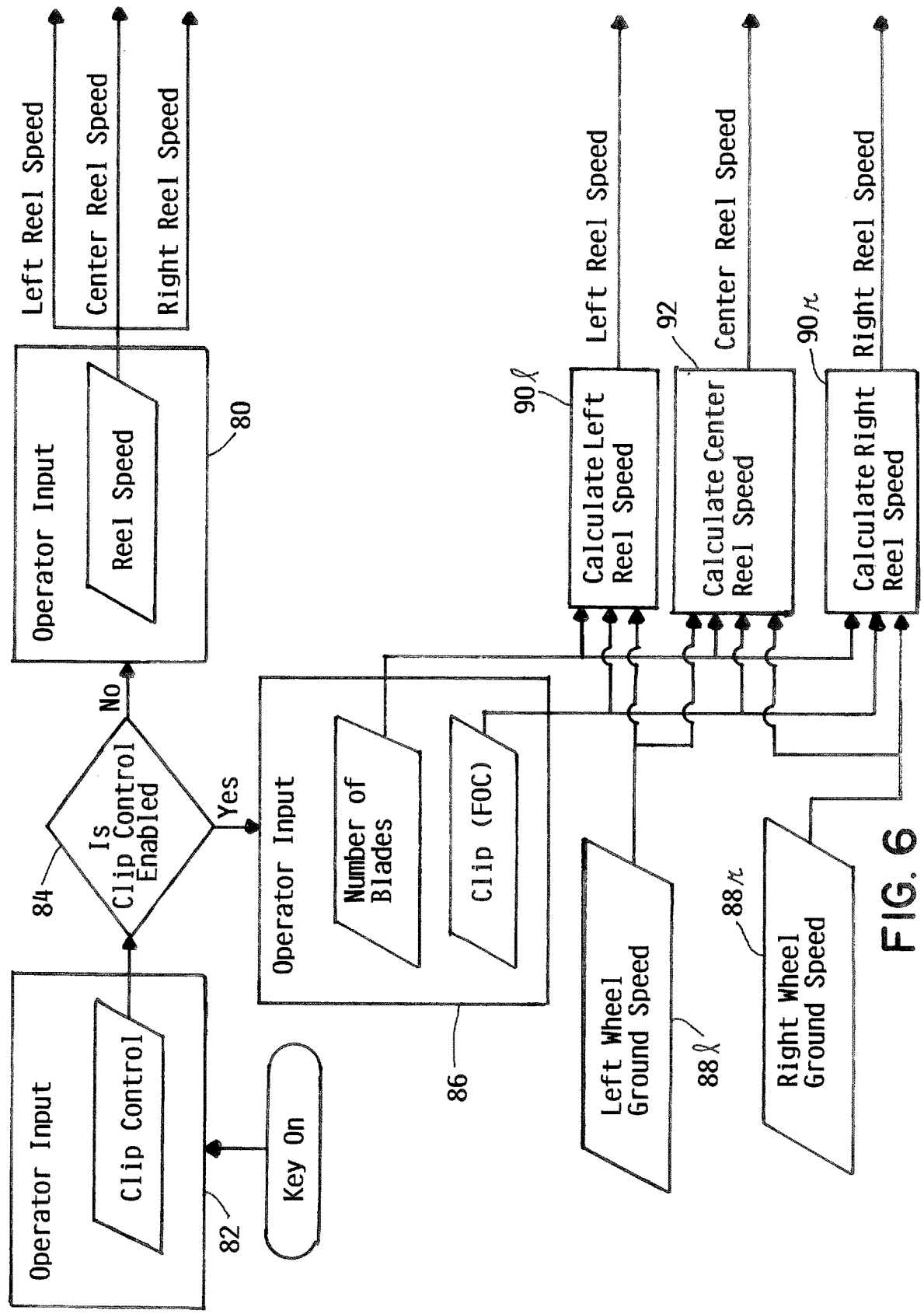
FIG. 6 is a flow chart illustrating an automatic clip control method of this invention.

Referring now to the flow chart of FIG. 6, a user of mower 2, whether the operator or a supervisor, may employ user interface 52 to set or program into master controller 58 at block 80 a desired nominal reel speed using a reel speed setting menu shown on display 54 of user interface 52 by manipulating the navigation/data entry buttons 56. An output is then sent from block 80 to sub-controllers on reel motors 68 on cutting units 60 to cause cutting reels 66 on all cutting units 60 to be driven at the desired nominal reel speed during a grass cutting operation of mower 2. Master controller 58 stores a default nominal reel speed for use when the user does not set or program a desired nominal reel speed for use in block 80. In addition, the reel speed is controlled to the desired or default nominal reel speed values only when the automatic clip control function, which will now be described, has been disabled by the user at block 82. The default state for the automatic clip control function is enabled. Thus, if the user has not intentionally disabled the automatic clip control function at block 82, the control method branches at block 84 to implement automatic clip control.

A user of mower 2, whether the operator or a supervisor, may further employ user interface 52 to set or program into master controller 58 a desired nominal clip using a clip setting menu shown on display 54 of user interface 52 by manipulating the navigation/data entry buttons 56. More particularly, at block 86 the clip setting menu allows the user to input the number of blades on cutting reels 66 provided on cutting units 60 carried by frame 4 of mower 2. For this purpose, it is assumed that all cutting units 60 installed on mower 2 at a given time will be identical to each other and have the same number of blades on their cutting reels 66.

In one example, there are four possible choices for the number of blades: 5, 8, 11 and 14 blades. The 5 or 8 blade choices would be typical of cutting units 60 used on fairways while the 11 or 14 blade choices would be typical of cutting units 60 used on greens. The 11 blade setting is used as a default value by master controller 58 in the event the user does not input a blade setting. Rather, than having the user manually input the number of blades into the clip setting menu, it would also be possible for cutting units 60 to electronically transmit data to master controller 58 identifying the specific model of cutting units carried thereon to allow master controller 58 to determine the blade count information automatically from information stored therein correlating the cutting unit model to the number of blades carried on cutting reels 66 thereof.

Another screen in the clip setting menu allows the user at block 86 to input a selected clip into master controller 58. In one embodiment hereof, the minimum clip is 0.060 inches, the maximum clip is 1.00 inches, and the increments of change between the minimum and maximum clips is 0.005 inches. The settable maximum and minimum clip values can be different depending upon the blade count with the higher blade counts typically used on greens having lower maximum and minimum clip values than the same values that would be permitted for the lower blade counts typically used on fairways. Regardless, the user has the ability to set a single point value for the clip, e.g. 0.25 inches for cutting units having 5 blades within a 0.060 to 0.560 inch range of possible clip choices. A 0.125 inch clip setting is used as a default value by master controller 58 in the event the user does not input a selected clip setting but the automatic clip control function is enabled.

Once the user has picked a selected clip, master controller 58 uses the selected clip and blade count information to determine the speed at which cutting reels 66 must be driven in relation to the ground speed of frame 4 of mower 2 to provide the selected clip. When the automatic clip control function is enabled, master controller 58 will use the actual ground speed of frame 4 of mower 2 to vary the output signals to the sub-controllers on reel motors 68 to thereby vary the rotational speeds of cutting reels 66 in correspondence with changes in the ground speed of frame 4 of mower 2. Thus, as the operator uses traction pedal 24 to vary the speed of mower 2 during a cutting operation, the clip provided by cutting units 60 carried on frame 4 of mower 2 will remain substantially the same. As the ground speed increases, the rotational speed of cutting reels 66 will increase, and vice versa. Accordingly, the operator is relieved of the burden of having to maintain a substantially constant ground speed so as not to affect the clip since the clip is automatically maintained even if the operator speeds up or slows down while mowing grass.

The Applicants of this invention have discovered that the clip is further affected during turns of mower 2 and that the automatic clip control function described above does not address this problem. In a turn and assuming the operator has not accelerated or decelerated, the ground speed of the centerline of frame 4 of mower 2 will remain constant so that the clip control function will, without more, continue to drive all cutting reels 66 at the same speed as when frame 4 had been traveling straight ahead. However, during a turn to the left or the right and in mower 2 of this invention having a gang configuration in which some of cutting units 60 are laterally offset from the centerline of frame 4, at least one cutting unit (i.e. one of 60l or 60r) will be outboard of the centerline of frame 4 to be disposed on the outside of the turn, at least one cutting unit (i.e. the other of 60l or 60r) will be inboard of the centerline of frame 4 to be disposed on the inside of the turn, and one cutting unit 60c will remain substantially on the centerline of frame 4. Thus, the Applicants have realized that using the single, common rotational speed for cutting reels 66 in all cutting units 60 that had been used when mower 2 is traveling straight actually maintains the desired clip only for cutting unit 60c on the centerline of frame 4 of mower 2 during turns of mower 2.

To maintain the desired clip for the other remaining laterally offset cutting units 60l, 60r, the Applicants have further realized that the cutting unit(s) 60 on the outside of the turn must have their rotational speeds increased in an amount sufficient to compensate for the fact that they are traveling faster over the ground relative to the centerline of frame 4 during the turn than when frame 4 was traveling straight ahead. Similarly, the Applicants have further realized that the cutting unit(s) 60 on the inside of the turn must have their rotational speeds decreased in an amount sufficient to compensate for the fact that they are traveling slower over the ground relative to the centerline of frame 4 during the turn than when frame 4 was traveling straight ahead. Again, assuming a constant ground speed of the centerline of frame 4 during the turn as when mower 2 was traveling straight ahead, the amount of the increase and decrease in the reel speeds of the laterally offset cutting units 60l, 60r is governed by the sharpness of the turn with the increase and decrease becoming larger as the turn becomes sharper and becoming smaller as the turn becomes gentler.

In the embodiment of mower 2 shown herein having a 2-1 gang configuration, the laterally offset front cutting units 60l, 60r are ahead of front wheels 6l, 6r with the centerlines of cutting units 60l, 60r generally aligned, but not necessarily entirely aligned, with the centerlines of front wheels 6l, 6r. Mower 2 is provided with an electronic differential in which front wheels 6l, 6r are rotated at different speeds during turns of mower 2 to prevent wheel scrubbing. This is accomplished in one embodiment by using a sub-controller on steering motor 48 to send a steering input comprising the angle of the turn from the steerable rear wheel 6r or from steering motor 48 to the sub-controllers for wheel motors 22. Other ways of acquiring the steering angle input, e.g. a separate steering angle sensor, could be used on mower 2 or on other mowers in which wheel motors 22 are driven by hydraulic motors. During turns, the sub-controllers for wheel motors 22 use such steering angle input to vary the speed of their associated wheel motors 22 to increase the speed of rotation of front wheel on the outside of the turn (i.e., one of 6l or 6r) and to decrease the speed of rotation of front wheel (i.e., the other of 6l or 6r) on the inside of the turn. In addition, wheel motors 22 have sensors built into them that provide the instantaneous ground speed of the left front wheel 6l and the right front wheel 6r to master controller 58.

The Applicants have realized that the electronic differential function provided for front wheels 6l, 6r along with the fact that the front cutting units 60l, 60r are generally aligned with front wheels 6l, 6r can serve as an efficient proxy for also controlling the speed of rotation of cutting reels 66 of all cutting units 60. In one embodiment for accomplishing this, the instantaneous actual ground speeds of the left drive wheel 6l and the right drive wheel 6r are input into blocks 88l and 88r. This wheel ground speed input is then used by master controller 58 at blocks 90l, 90r to calculate the speeds at which cutting reels 66 of the left front cutting unit 60l and the right front cutting unit 60r, respectively, should be driven to maintain the desired clip in both straight ahead motion and in turns of mower 2. In addition, master controller 58 at block 92 uses the average of the speeds so calculated for cutting reels 66 of the front cutting units 60l, 60r as the speed ((left cutting reel speed+right cutting reel speed)/2) at which cutting reel 66 for the center rear cutting unit 60c should be driven.

Accordingly, in straight ahead travel of mower 2, the reels of all three cutting units will be driven at a single substantially common speed that substantially provides the desired clip according to the actual ground speed of frame 4 of mower 2 over the turf surface as established by the position of traction pedal 24. When mower 2 is turning and the electronic differential drives the front wheel on the outside of the turn faster than the front wheel on the inside of the turn, the method and formula above will increase the speed of cutting reel 66 on the front cutting unit on the outside of the turn, will leave the speed of cutting reel 66 on the center rear cutting unit unchanged, and will decrease the speed of cutting reel 66 on the front cutting unit on the inside of the turn. As soon as mower 2 straightens out again, the reels of all three cutting units will return to their single substantially common speeds before the turn, again assuming that frame 4 of mower 2 is being driven at the same speed before, during and after the turn by virtue of the operator maintaining an unchanged position of traction pedal 24.

Various other methods could be used for calculating the speeds of reels 66 of cutting units 60 used during the clip control function. For example, master controller 58 could be programmed with data which indicates the actual distance between the centerlines of the laterally offset cutting units and mower centerline cl for whatever gang configuration is carried on frame 4 of mower 2. Master controller 58 could then monitor or receive a single ground speed input comprising the actual ground speed of mower centerline cl as well as an input indicating whether mower 2 was traveling straight ahead or was traveling in a turn. Master controller 58 could use such inputs along with the cutting unit offset distances during turns of mower 2 to mathematically determine the reel speeds needed for all cutting units 60 carried on frame 4 of mower 2 during both straight ahead motion and turns of mower 2.

Generator Power Output Control

Figure 7:
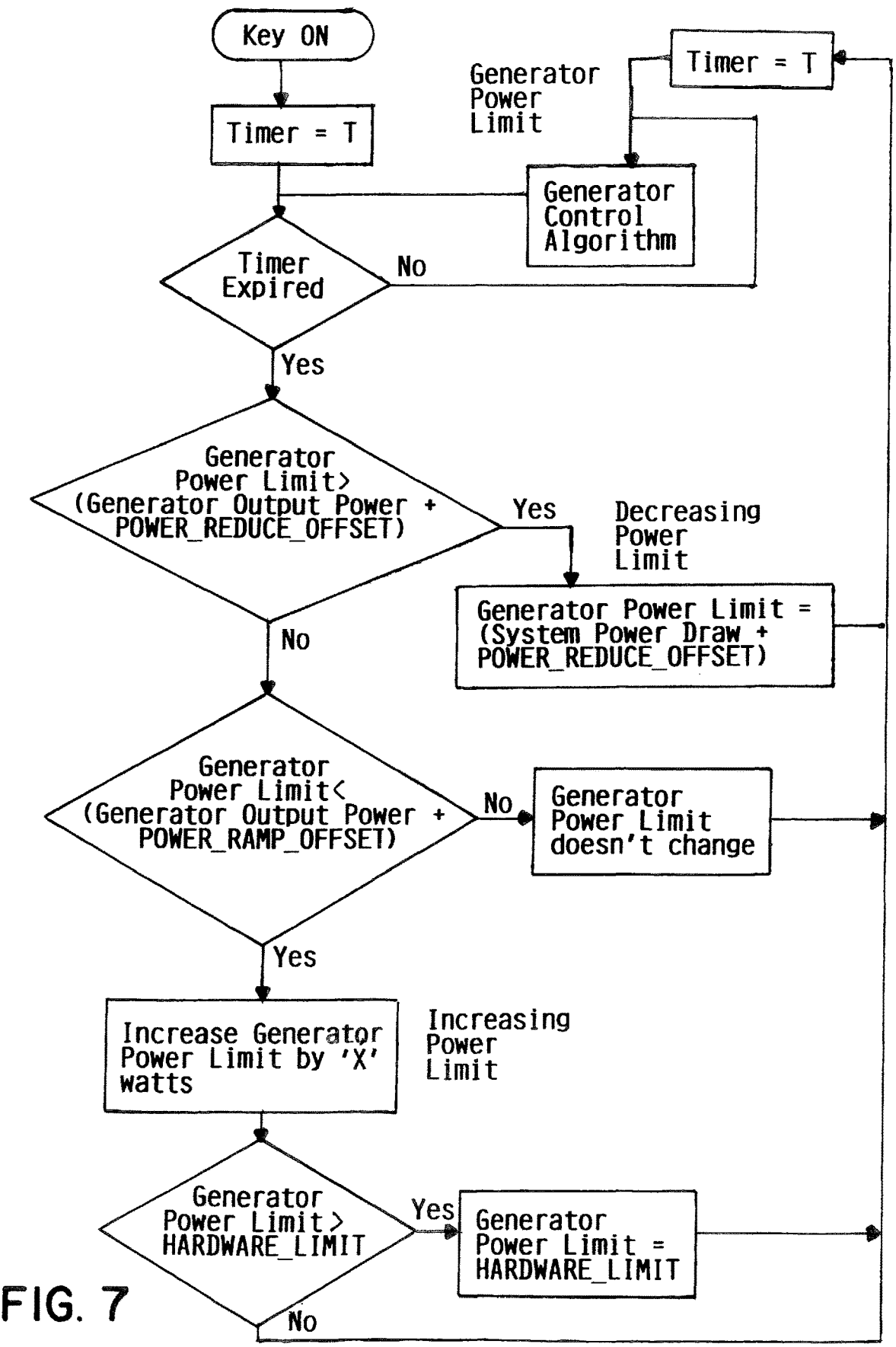
FIG. 7 is a flow chart illustrating a generator output power control method of this invention.

FIG. 7 depicts a control method of controlling or limiting the power output of generator 10 in certain operational conditions of mower 2. This control method can be executed by master controller 58 or by a sub-controller for generator 10 during operation of mower 2. The purpose of the control method is to prevent sudden electrical load changes from causing dramatic step responses in engine 8. The control method involves the following variables:
  a. Generator Output Power comprising the actual instantaneous output power of generator 10;
  b. Generator Power Limit comprising the maximum power output permitting by the control method for generator 10;
  c. Power_Reduce_Offset comprising a fixed value used by the control method to decrease the Generator Power Limit when the Generator Output Power is decreasing (i.e. mower 2 is tending towards a steady state or is decelerating) to keep the Generator Power Limit and Generator Output Power as close to each other as possible because the difference between the two is what leads to step responses in engine 8;
  d. Power_Ramp_Offset comprising a fixed value used by the control method to increase the Generator Power Limit when the Generator Output Power is increasing (i.e. mower 2 is accelerating) and the Generator Output Power is approaching the Generator Power Limit; and
  e. Hardware_Limit comprising the maximum power output of generator 10 determined by the hardware limitations of generator 10.

When a sudden and large increase is electrical load is experienced by mower 2, the control method of this aspect of the invention gradually ramps up the Generator Power Limit to assure engine 8 isn't loaded at a rate which is too fast. Controlling the Generator Power Limit controls the Generator Output Power. As a result, by limiting the Generator Output Power to the Generator Power Limit in high electrical demand scenarios, the electrical components requiring electrical power will draw sufficient power from battery pack 12 to satisfy whatever excess power requirements such components have above what generator 10 can provide when operating at the Generator Power Limit. Essentially, battery pack 12 satisfies temporary spikes of power demand on the electrical system to permit engine 8 to perform with minimal engine droop because the load from generator 10 on engine 8 is temporarily dampened by the control method shown in FIG. 7. This results in better fuel efficiency, less engine droop, and less audible noise from engine 8 since engine 8 is operated more consistently in an optimal power region.

The method of FIG. 7 is preferably repeated on a fixed time interval 'T'. 'X' is the power in watts which is used to gradually increase the Generator Power Limit. 'T' and 'X' can be set to give a preferred load ramping of engine 8. The variables are specific to a particular model of mower 2 and may change for different mowers. In one example, T could be equal to 10 ms and X could be equal to 20 W.

Using the examples set forth above for 'T' and 'X', the control method of FIG. 7 will determine a new Generator Power Limit every 10 ms. Assuming mower 2 is stationary and the operator uses traction pedal 24 to command a fast acceleration requiring a high power draw of 5 kw for 5 seconds, the control method variables for T and X as set forth above would gradually increase the Generator Power Limit from 0 to 5 kw at a rate of 2 kw/second. Thus, in this example, the electrical power required to accelerate mower 2 initially primarily comes from battery pack 12. However, after 2½ seconds, generator 10 begins supplying all the required electrical power to the electrical system and further begins replacing the power discharged from battery pack 12 through charging of battery pack 12. As a result, engine load is linearly increased during the fast acceleration start and minimal engine droop occurs.

Regenerative Braking Absorption

Figure 8:
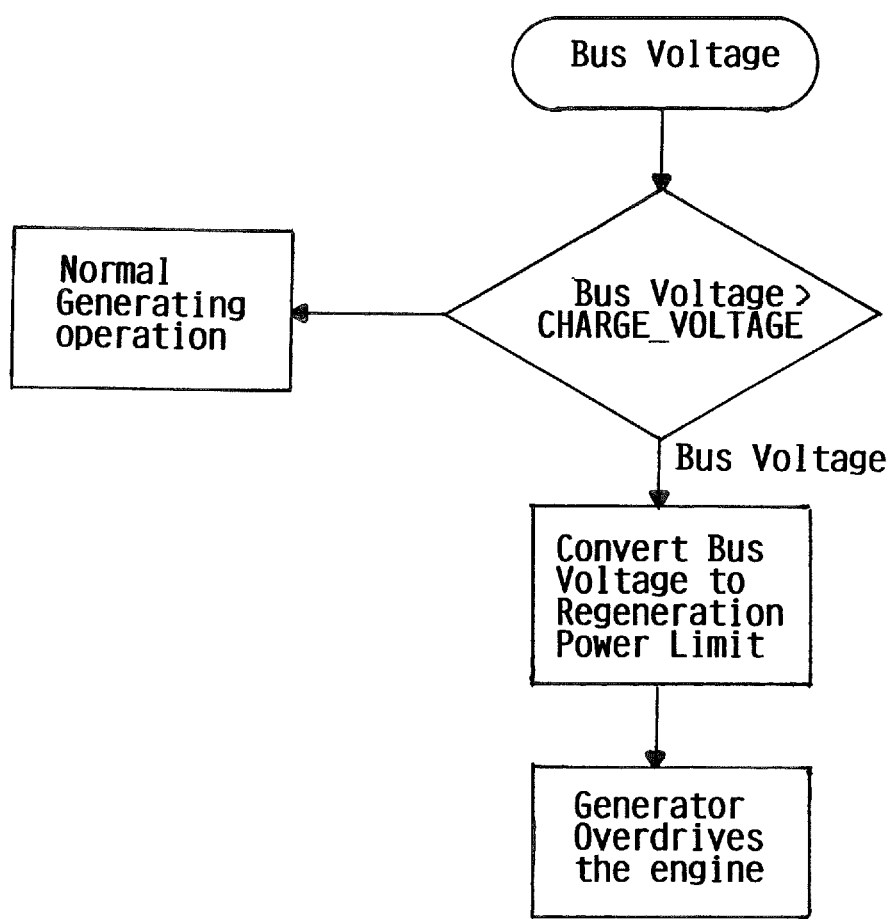
FIG. 8 is a flow chart illustrating a regenerative braking absorption method of this invention.

FIG. 8 depicts a control method for preventing the use of regenerative braking from overcharging and thereby damaging battery pack 12. This control method is executed by master controller 58 during operation of mower 2. The purpose of the control method is to prevent the electrical power being generated during regenerative braking from overcharging and thereby damaging battery pack 12 or the electrical power system of mower 2. The control method involves the following variables:
  a. Bus Voltage comprising the voltage of battery pack 12; and
  b. Charge_Voltage is a fixed value (e.g. 55V) comprising the voltage that generator 10 targets for production as specified by the generator manufacture.

The operation of the regenerative braking absorption control method is to suppress the Bus Voltage anytime it reaches a voltage greater than the Charge_Voltage. In order to do this the control method switches generator 10 out of its generating mode and into a motor mode. In a motor mode, generator 10 will spin as a motor in a direction that powers or overdrives drive shaft 16 of engine 8. In effect, generator 10 begins using engine 8 as a load to bleed off the excess electrical energy generated from traction motors 22 during regenerative braking which would otherwise have been applied to the electrical system of mower 2. The only noticeable effect of this action is that the speed of engine 8 may increase which increase may be perceptible to the operator. However, this is simpler and more cost effective than bleeding off excess electrical energy through banks of resistors as in prior art mowers.

Since the product of generator 10 overdriving engine 8 is audibly noticeable, it's desirable to use generator 10 as a motor for this purpose only to the amount needed to protect the system. To do this, the control method of this invention increases the generator motor power output as a function of how much Bus Voltage exceeds Charge_Voltage. For example, when Bus Voltage is slightly over Charge_Voltage (e.g. by 1V to 2V), the output power of generator 10 as a motor is limited to a fairly low level, e.g. 10-25% of its maximum. When the Bus Voltage is substantially over Charge_Voltage (e.g. by 7V to 10V), the output power of generator 10 is increased to a high level, e.g. 75%-100% of its maximum. In between the low and high levels of the excess of Bus Voltage over Charge_Voltage, the permitted output power of generator 10 acting as a motor can be either linear or exponential.

Automatic Maximum Ground Speed Reductions During Turns

Figure 9A:
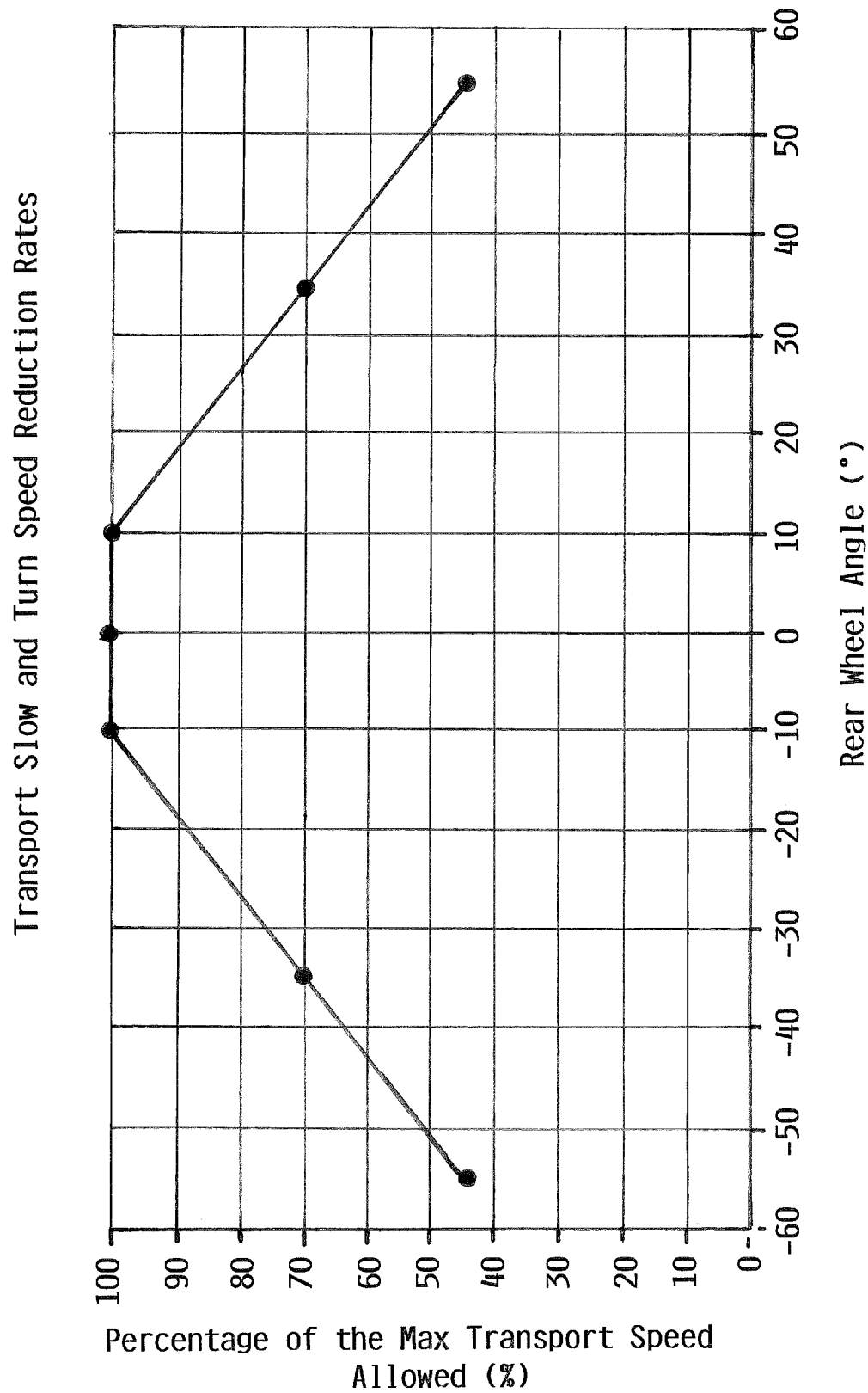
FIGS. 9A and 9B are graphs illustrating a control method for controlling the maximum ground speeds in transport and in mowing, respectively, in accordance with a steering angle of the reel mower of FIG. 1.
Figure 9B:
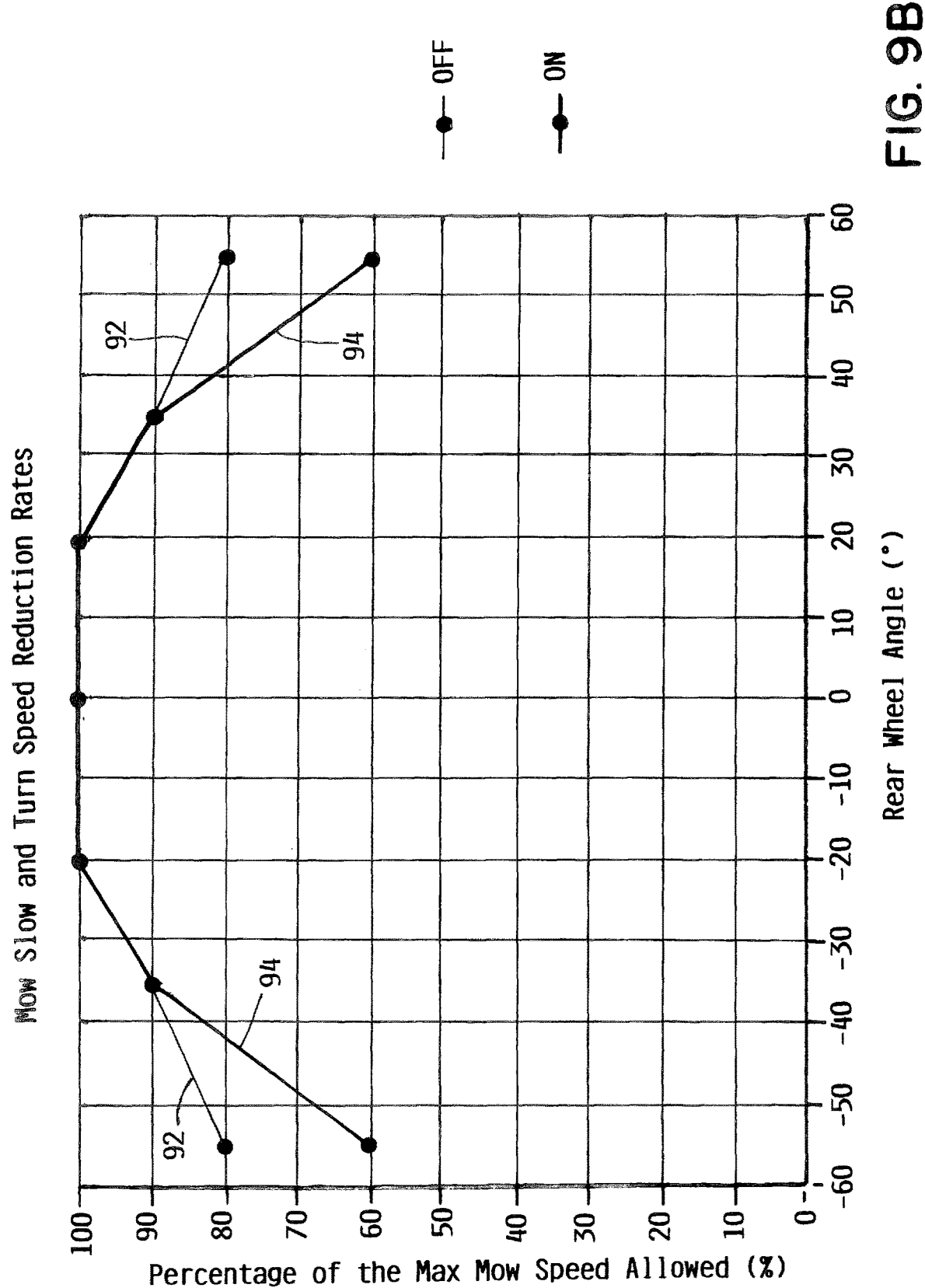

FIGS. 9A and 9B comprise graphs that illustrate various control methods for controlling the maximum ground speed during transport and the maximum ground speed during mowing, respectively, when mower 2 is being turned by the operator during transport of mower 2 or during a grass cutting operation. Typically, the maximum ground speed during transport in which cutting units 60 are raised off the turf surface and are inoperative is higher than the maximum ground speed during mowing in which cutting units 60 are lowered into contact with the turf surface and cutting reels 66 thereof are in operation. As noted earlier herein, a user of the mower may set or program into master controller 58 a desired maximum ground speed during transport as well as a desired maximum ground speed during mowing.

Referring first to FIG. 9A, the control method shown therein is implemented whenever the operator has placed mower 2 into the transport mode thereof. The control method of FIG. 9A modifies whatever maximum ground speed during transport had been set by the operator in accordance with the steering angle of steerable rear wheel 6c as established by the operator in a range of 110° (from +55° to −55°) by manipulation of steering wheel 42. In a small range on either side of 0° (from +10° to −10°) corresponding to a slight turn, there is no reduction in the maximum ground speed in transport. In steeper turns on either side of 0° (in a range from +10° to +55° and in a range from −10° to −55°), the maximum ground speed in transport is reduced in a linear arrangement by approximately 1.25% for each incremental 1° of angle increase. Thus, in a full 60° turn either to the left or right, the maximum ground speed is reduced to 45% of whatever nominal maximum ground speed had been set by the operator for use during transport.

Referring now to FIG. 9B, the control method shown therein is implemented whenever the operator has placed mower 2 into the mowing mode thereof. The control method of FIG. 9B modifies whatever maximum ground speed during a mowing operation had been set by the operator in accordance with the steering angle of steerable rear wheel 6c as established by the operator in a range of 110° (from +55° to −55°) by manipulation of steering wheel 42. There are two control regimes in FIG. 9B, one that is used as a default OFF regime 92 and a second that is used in a user enabled ON regime 94. The OFF and ON regimes 92 and 94 coincide at turns from 0° to 35°. Above 35°, the default OFF regime 92 has a less aggressive reduction in the maximum ground speed while mowing while the user enabled ON regime 94 has a more aggressive reduction in the maximum ground speed while mowing.

Like the control method of FIG. 9A, the control method of FIG. 9B provides no reduction in the maximum ground speed in a small range on either side of 0° (from +20° to −20°) corresponding to a slight to moderate turn. In the next 15° of a turn to either side (in a range from +20° to +35° and in a range from −20° to −35°), the maximum ground speed while mowing is reduced in a first linear arrangement by 0.75% for each incremental 1° of angle increase. For steeper turns to either side (in a range from +30° to +55° and in a range from −30° to −55°), the maximum ground speed while mowing is reduced in a second linear arrangement by 0.50% for each incremental 1° of angle increase in the OFF regime 92 and in a third linear arrangement by 1.5% for each incremental 1° of angle increase in the ON regime 94. Thus, the operator of mower 2 has a choice between using a less aggressive maximum ground speed reduction at higher angles of turn while mowing by using the OFF regime or using a more aggressive maximum ground speed reduction at higher angles of turn by using the ON regime through appropriate selection of one regime or the other regime through user interface 52.

Overall, the control method of FIG. 9A provides larger overall reductions in maximum ground speed than the control method of FIG. 9B. This is primarily a consequence of the fact that the maximum ground speed during transport is ordinarily set to be higher than the maximum ground speed while mowing. The choice of less or more aggressive reductions in the maximum ground speed while mowing at higher angles of turn as shown in the OFF and ON regimes at 92 and 94 in FIG. 9B allows a particular operator to pick the reduction that he or she is most comfortable with given the mowing conditions that exist at the time or the type of mowing to be performed, e.g. fairways or greens. In some cases, a supervisor can initially enable the ON regime 94 for a less experienced operator without providing a passcode to the less experienced operator that is needed to override the ON setting. By contrast a more experienced operator may be able to choose the OFF setting at his or her discretion using a passcode supplied to the more experienced operator by the supervisor.

While different linear reductions are disclosed above for reducing the maximum ground speed during at least some turns of mower 2, mixed linear and non-linear reductions or all non-linear reductions could also be used in place thereof. Moreover, in some embodiments, a user of the mower, i.e. the supervisor or the operator, could employ user interface 52 to program into mater controller 58 a custom scheme for reducing the maximum mowing and and/or transport ground speeds during turns of mower 2 according to the wishes of the user rather than relying on pre-programmed schemes.

Other Embodiments

Various modifications of this invention will be apparent to those skilled in the art. For example, the hybrid electric power system of mower 2 could comprise an all battery electric power system having a battery pack which is charged through regenerative braking or by virtue of being plugged into a charging station during periods of non-use. Other mixed electric, hydraulic and mechanical power systems could also be used to power drive wheels 6 and cutting reels 66.

The features of this invention as set forth in the preceding sections may all be used jointly in connection with a single mower 2. Alternatively, each of the features may be used singly on a given mower 2 or in various permutations or combinations of a plurality of features used together without using other of the features.

Accordingly, the scope of this invention shall be limited only by the appended claims.

The invention claimed is:

1. A method of providing and operating a gang reel mower, which comprises:
 (a) providing a plurality of reel cutting units including a center cutting unit and at least a pair of laterally offset cutting units, each reel cutting unit comprising a cutting reel rotatable about a substantially horizontal axis of rotation and a bedknife cooperable with the cutting reel for cutting grass;
 (b) arranging the cutting units in a gang configuration on a self-propelled frame of the mower and varying a ground speed of the frame of the mower during a grass cutting operation while the cutting units are cutting grass;
 (c) powering the cutting reels using power produced by a power system carried on the frame of the mower;
 (d) rotating the cutting reels at a substantially common rotational speed during straight ahead motion of the frame of the mower while conducting the grass cutting operation;
 (e) rotating all of the cutting reels at different calculated rotational speeds relative to each other, wherein the rotational speed of the center cutting unit is calculated as a function of the calculated rotational speeds of the laterally offset cutting units, during turns of the frame of the mower while conducting the grass cutting operation; and (f) wherein the rotating steps of limitations (d) and (e) substantially maintain a selected clip during the straight ahead motion of the frame of the mower and during the turns of the frame of the mower as the ground speed of the frame is varied while conducting the grass cutting operation.

2. The method of claim 1, wherein the rotating steps of limitations (d) and (e) of claim 1 occur automatically without operator intervention during the grass cutting operation.

3. The method of claim 1, further including the step of choosing the selected clip to be provided by the reel cutting units during the grass cutting operation.

4. The method of claim 1, wherein the center cutting unit and the at least a pair of laterally offset cutting units are separated by a gap, the center cutting unit being longitudinally offset from the laterally offset cutting units and being positioned to cover the gap between the laterally offset cutting units such that the cutting units collectively cut an unbroken swath of grass.

5. The method of claim 1, wherein the center cutting unit and the at least a pair of laterally offset cutting units are separated by a gap, the center cutting unit being longitudinally offset from the laterally offset cutting units and being positioned to cover the gap between the laterally offset cutting units such that the cutting units collectively cut an unbroken swath of grass, wherein the frame of the mower is self-propelled by a pair of laterally offset drive wheels, wherein each laterally offset cutting unit is substantially laterally aligned with and longitudinally offset from a different one of the laterally offset drive wheels.

6. The method of claim 5, wherein the rotating steps of limitations (d) and (e) of claim 1 are determined in part in the following manner:
(a) setting the rotational speed of the cutting reel of the first laterally offset cutting unit at a first value determined from a ground speed of whichever drive wheel is substantially laterally aligned with the first laterally offset cutting unit in order to maintain the selected clip during the grass cutting operation during the straight ahead motion of the frame of the mower and during the turns of the frame of the mower; and
(b) setting the rotational speed of the cutting reel of the second laterally offset cutting unit at a second value determined from a ground speed of whichever drive wheel is substantially laterally aligned with the second laterally offset cutting unit in order to maintain the selected clip during the grass cutting operation during both the straight ahead motion of the frame of the mower and during the turns of the frame of the mower.

7. The method of claim 6, wherein the rotating steps of limitations (d) and (e) of claim 1 further comprise setting the rotational speed of the cutting reel of the center cutting unit by using an average of the first and second values of the rotational speeds of the first and second laterally offset cutting units.

8. A gang reel mower, which comprises:
(a) a plurality of reel cutting units including a center cutting unit and at least a pair of laterally offset cutting units arranged in a gang configuration on a self-propelled frame of the mower, each reel cutting unit comprising a cutting reel rotatable about a substantially horizontal axis of rotation and a bedknife cooperable with the cutting reel for cutting grass;
(b) a power system carried on the frame of the mower for rotating the cutting reels to cut grass; and
(c) an electronic controller carried on the frame, the controller being configured:
(i) to rotate the cutting reels at a substantially common rotational speed relative to one another during straight ahead motion of the frame of the mower to maintain a desired clip during a grass cutting operation during the straight ahead motion of the frame; and
(ii) to rotate all of the cutting reels at different calculated rotational speeds relative to one another, wherein the rotational speed of the center cutting unit is calculated as a function of the calculated rotational speeds of the laterally offset cutting units, during turns of the frame of the mower to maintain the desired clip while conducting the grass cutting operation during turns of the frame.

9. The mower of claim 8, wherein the center cutting unit and the at least a pair of laterally offset cutting units are separated by a gap, the center cutting unit being longitudinally offset from the laterally offset cutting units and being positioned to cover the gap between the laterally offset cutting units such that the cutting units collectively cut an unbroken swath of grass.

* * * * *